United States Patent
Lowe et al.

(10) Patent No.: US 12,287,298 B2
(45) Date of Patent: *Apr. 29, 2025

(54) SYSTEM AND METHOD FOR UTILIZATION OF PHOTON COUNTING FOR COLORIZATION IN A CABINET X-RAY SYSTEM

(71) Applicant: KUB Technologies Inc., Stratford, CT (US)

(72) Inventors: Chester Lowe, Stratford, CT (US); Vikram Butani, Stratford, CT (US)

(73) Assignee: KUB Technologies Inc., Stratford, CT (US)

( * ) Notice: Subject to any disclaimer, the term of this patent is extended or adjusted under 35 U.S.C. 154(b) by 254 days.

This patent is subject to a terminal disclaimer.

(21) Appl. No.: 18/193,067

(22) Filed: Mar. 30, 2023

(65) Prior Publication Data
US 2023/0384243 A1    Nov. 30, 2023

Related U.S. Application Data

(60) Provisional application No. 63/326,755, filed on Apr. 1, 2022.

(51) Int. Cl.
*G01N 23/04* (2018.01)
*G01N 23/083* (2018.01)

(52) U.S. Cl.
CPC .......... *G01N 23/04* (2013.01); *G01N 23/083* (2013.01); *G01N 2223/04* (2013.01); *G01N 2223/401* (2013.01); *G01N 2223/408* (2013.01); *G01N 2223/601* (2013.01); *G01N 2223/6123* (2013.01); *G01N 2223/6126* (2013.01)

(58) Field of Classification Search
CPC .. G01N 23/04; G01N 23/083; G01N 2223/04; G01N 2223/401; G01N 2223/408; G01N 2223/601; G01N 2223/6123; G01N 2223/6126
See application file for complete search history.

(56) References Cited

U.S. PATENT DOCUMENTS

| | | |
|---|---|---|
| 9,642,581 B2 | 5/2017 | Lowe et al. |
| 10,670,545 B2 | 6/2020 | Butani et al. |
| 10,729,399 B2 | 8/2020 | Butani et al. |

(Continued)

*Primary Examiner* — Kiho Kim
(74) *Attorney, Agent, or Firm* — Ziegler IP Law Group LLC

(57) ABSTRACT

A cabinet X-ray image system for obtaining colorized or greyscale density X-ray images of a specimen has a cabinet defining an interior chamber. The cabinet includes a walled enclosure surrounding the interior chamber, a door configured to cover the interior chamber and a sampling chamber for containing the specimen. The system further includes a display and an X-ray unit. The X-ray unit includes an X-ray source, an X-ray detector and a specimen platform configured to receive the specimen. Moreover, the system includes a controller configured to selectively energize the X-ray source, control the X-ray detector to collect the X-rays, determine the density of different areas of the specimen and create a density X-ray image of the specimen. The density X-ray image is colorized or greyscale. The controller is also configured to selectively display the density X-ray image of the specimen on the display.

13 Claims, 10 Drawing Sheets

(56) References Cited

U.S. PATENT DOCUMENTS

| | | | | |
|---|---|---|---|---|
| 2009/0304249 A1* | 12/2009 | Wu | ........................ | A61B 6/482 |
| | | | | 382/131 |
| 2017/0248532 A1* | 8/2017 | Kadambi | .............. | H01J 35/065 |
| 2020/0372644 A1* | 11/2020 | Butani | ................... | G16H 30/20 |

* cited by examiner

SYSTEM AND METHOD FOR UTILIZATION OF PHOTON COUNTING FOR COLORIZATION IN A CABINET X-RAY SYSTEM

CROSS-REFERENCE TO RELATED APPLICATIONS

This application claims priority to U.S. provisional application No. 63/326,755 filed on 1 Apr. 2022, the disclosure of which is incorporated herein by reference in its entirety for all purposes.

TECHNICAL FIELD

The aspects of the disclosed embodiments relate generally to the field of imaging of specimen, and more specifically to a system and a method for obtaining colorized or greyscale density X-ray images of specimen.

BACKGROUND

Cancer is a significant global health issue and a leading cause of death. Cancer is a complex and heterogeneous disease that arises from the uncontrolled growth of abnormal cells in the body. The complexity and heterogeneity of cancer make it challenging to develop effective diagnostic and therapeutic. Cancer can be classified into many different types, based on the location and type of cells involved. Efforts have been made to focus on improving understanding of cancer biology and developing new diagnostic and therapeutic approaches.

Over the years, advancements in technology and medical research have led to the development of various diagnostic techniques for cancer. Some of the latest techniques include liquid biopsy, which involves the analysis of cancer-specific biomarkers in body fluids, and molecular imaging, which uses radiolabeled molecules to detect and map the location of cancer cells in the body.

Early detection and diagnosis of cancer are critical for improving treatment outcomes and survival rates. Diagnosis of cancer involves a combination of physical examination, laboratory tests, and imaging studies. Some common diagnostic tests include biopsy, which involves the removal of a sample of tissue for examination under a microscope, blood tests, imaging studies such as X-rays, CT scans, MRI, and PET scans. Cancer can affect any part of the body and is characterized by the formation of tumors or abnormal growths of tissue.

Breast cancer is a type of cancer that begins in the breast tissue. Over the past few decades, significant progress has been made in understanding the biology of breast cancer and developing new treatments to improve patient outcomes. X-ray imaging of the breast, also known as mammography, is an important screening tool for breast cancer. Mammography uses low-dose X-rays to create images of the breast tissue, which can reveal changes or abnormalities in the tissue that may be signs of cancer. Traditionally, X-ray radiograms often failed to provide critical information pertaining to abnormality of specimen, distinguish component of tissue, and many more.

Thus, in light of the foregoing discussion, there exists a need for a system or a method for obtaining colorized or greyscale density X-ray images of specimen.

Further limitations and disadvantages of conventional and traditional approaches will become apparent to one of skill in the art through comparison of such systems with some aspects of the present disclosure as set forth in the remainder of the present application with reference to the drawings.

SUMMARY

The aspects of the disclosed embodiments provide a method for non-destructive technique to analyze specimen, substantially as shown in and/or described in connection with at least one of the figures, as set forth more completely in the claims.

In an example, the aspects of the disclosed embodiments provide a cabinet X-ray image system for obtaining colorized or greyscale density X-ray images of a specimen. In one embodiment, the system includes a cabinet defining an interior chamber. The system further comprises a walled enclosure surrounding the interior chamber, a door configured to cover the interior chamber and a sampling chamber for containing the specimen. The system further comprises a display and an X-ray unit. The X-ray unit includes an X-ray source, an X-ray detector and a specimen platform configured to receive the specimen. The system further comprises a controller configured to selectively energize the X-ray source to emit X-rays towards the specimen and the X-ray detector, control the X-ray detector to collect X-rays that pass through the specimen when the X-ray source is energized, determine the density of different areas of the specimen from data collected from the X-ray detector and create a density X-ray image of the specimen. The different areas of the specimen are indicated as a density or range of densities based on the determined density of different areas of the specimen. The density X-ray image is colorized or greyscale. The controller is also configured to selectively display the density X-ray image of the specimen on the display.

In another example, the aspects of the disclosed embodiments provide a method for obtaining colorized or greyscale density X-ray images of a specimen using a cabinet X-ray image system. In one embodiment, the cabinet X-ray image system comprises a cabinet defining an interior chamber. The cabinet comprises a walled enclosure surrounding the interior chamber, a door configured to cover the interior chamber and a sampling chamber for containing the specimen. Further, the system comprises a display and an X-ray unit. The X-ray unit includes an X-ray source, an X-ray detector and a specimen platform configured to receive the specimen. The system also comprises a controller configured to selectively energize the X-ray source to emit X-rays towards the specimen and the X-ray detector, control the X-ray detector to collect X-rays that pass through the specimen when the X-ray source is energized, determine the density of different areas of the specimen from data collected from the X-ray detector and create a density X-ray image of the specimen. The different areas of the specimen are indicated as a density or range of densities based on the determined density of different areas of the specimen, wherein the density X-ray image is colorized or greyscale. The controller is also configured to selectively display the density X-ray image of the specimen on the display.

It is to be appreciated that all the aforementioned implementation forms can be combined. It has to be noted that all devices, elements, circuitry, units, and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity that performs that specific step or functionality, it should be clear for a skilled person that these methods and functionalities can be implemented in respective software or hardware elements, or any kind of combination thereof. It will be appreciated that features of the present disclosure are susceptible to being combined in various combinations without departing from the scope of the present disclosure as defined by the appended claims.

Additional aspects, advantages, features, and objects of the present disclosure would be made apparent from the drawings and the detailed description of the illustrative implementations construed in conjunction with the appended claims that follow.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

Figure 1:
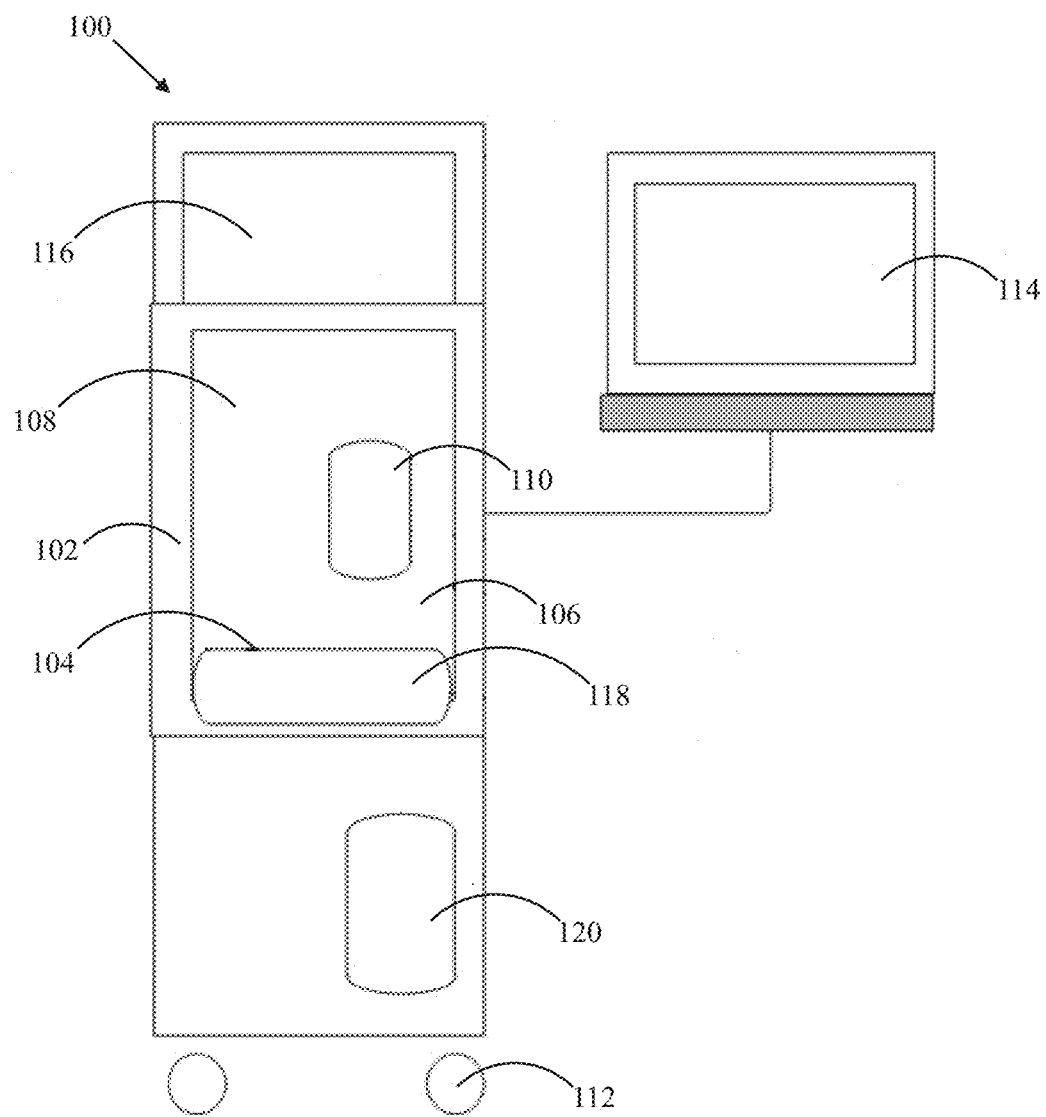
FIG. 1 is an illustration of a cabinet X-ray image system for obtaining colorized or greyscale density X-ray images of a specimen, in accordance with an embodiment of the present disclosure.

Referring to FIG. 1, there is shown a cabinet X-ray image system (generally referred by the reference numeral 100) for obtaining colorized or greyscale density X-ray images of a specimen. In particular, the system 100 is configured for non-destructive specimen analysis technique i.e., radiography, for detection of abnormalities such as tumour growth, blood clotting, tissue damaged and the like. However, an application of the system 100 is not limited to specimen radiography. For example, the system 100 can be employed for non-destructive testing, pathological procedures, radiographic analyses of specimen. The term "specimen" as used herein relates to a type of organic sample (e.g., human or animal tissue or body part thereof, artificial or lab grown organ/tissue, insect, animal commonly used in laboratory, biopsy sample, etc.) and inorganic samples (e.g., teeth, kidney stone, gallstone etc.). It will be appreciated by a person skilled in the art that the specimen may be any type of biological material which may require X-ray analysis.

The cabinet X-ray incorporates an X-ray source and a photon-counting detector for the production of organic and inorganic specimen images. The controller receives continuous data stream (e.g., number of photons detected per unit time, and location of photon strike to the detector array) from the photon detector and determines the orientation and density composition of the specimen based on the captured photon data. This facilitates and aids a healthcare provider for diagnosis or ensuring that a proper amount of tissue has been excised from a patient. In particular, the system and method associated with capturing an X-ray image utilizing a photon-counting detector allow the cabinet X-ray system to attain and optimize images with the colorization radiograph for easier distinction. The term "healthcare provider" refers to an entity providing medical assistance or support to the user. For example, the healthcare provider may be at least one of a doctor or doctor's office, a hospital or hospital staff, an insurance provider, a pharmacologist, research scientist, a therapist, and other medical entities that may be providing healthcare to the user.

The system 100 addresses various drawbacks associated with conventional systems employed in radiology by enabling two-dimensional X-ray imaging and specimen tomosynthesis, such as, for imaging breast specimens. The term "specimen tomosynthesis" as used herein related to three-dimensional imaging of specimens. Such three-dimensional imaging of specimens involves creation of a dataset by acquisition of multiple images of the specimen at multiple viewpoints, for example, over an arc or a linear path. Subsequently, a three-dimensional image of the specimen is constructed through reconstruction of the image dataset comprising multiple images. The system 100 enables to overcome the drawbacks associated with data received only from two-dimensional and tomosynthesis imaging systems. Consequently, the system 100 enables the use of tomosynthesis to efficiently provide accurate three-dimensional imaging of a specimen in which overlapping images having differing attenuation characteristics through application of a three-dimensional reconstruction algorithm.

The system 100 comprises a cabinet 102 defining an interior chamber. The cabinet 102 relates to an enclosed structure in which the specimen can be arranged. Further, X-rays from an X-ray source can be safely made incident upon the specimen without causing leakage of the X-rays outside the cabinet 102. The cabinet 102 comprises a walled enclosure surrounding the interior chamber 104, a door 106 configured to cover the interior chamber and a sampling chamber 108 for containing the specimen. In one example, the walled enclosure of the cabinet 102 is fabricated using a suitable material such as steel, lead or any other suitable material which provides shielding against X-rays. In such an example, the walled enclosure surrounding the interior chamber 104 can be fabricated using lead sheet or lead based alloy. Further, the interior chamber 104 comprises an interior space forming the sampling chamber 108 for containing the specimen. Further, access to the sampling chamber 108 is allowed via an opening 110 having a suitable moveable cover or door 106. In one example, the door 106 comprises a transparent window (not shown) fabricated using leaded glass.

In an example, the cabinet 102 is mounted on wheels 112 to allow convenient portability of the cabinet 102. It will be appreciated that cabinet 400 can be mounted on any suitable base or transport mechanism, for example, wheeled tracks, automated guided robot or any suitable platform to enable free movement of the cabinet 102.

In one embodiment, the specimen is selected from an excised tissue, an organ and a bone. For example, the specimen may be an excised breast tissue that is suspected to be cancerous. Consequently, the specimen can be processed by the system 100 to detect presence or absence of cancerous tumours within the excised tissue.

The system 100 further comprises a display 114. The display 114 can be implemented as a monitor that allows convenient viewing of X-ray images as well as any output of data processing. Optionally, the display 114 can be operably coupled to an input means such as a keyboard and mouse. In one embodiment, the display 114 can be implemented as a touchscreen device. For example, the display 114 can be implemented as a liquid crystal display (or LCD) screen, a cathode-ray tube (or CRT) display, thin-film-transistor liquid-crystal display (or TFT LED), a plasma displays, a light emitting diode (or LED) display, fluorescent devices and the like and may be a part of a laptop computer, a minicomputer, a tablet computer and the like. Optionally, the display 114 is mounted on an articulating arm that is operably coupled to the cabinet 102. Such an articulating arm is extended or contracted to enable convenient viewing of images on the display 114.

The system 100 comprises an X-ray unit. The X-ray unit refers to a portion of the system 100 that deals with emission of X-rays towards the specimen and subsequent detection of the emitted X-rays. The X-ray unit includes an X-ray source 116, an X-ray detector 118 and a specimen platform configured to receive the specimen. The X-ray source 116 refers to a component of the X-ray unit that is configured to emit X-rays towards the sample. As shown, the X-ray source 116 is located towards an upper part of the cabinet 102. Optionally, the X-ray source 116 can be located with an X-ray source enclosure. Further, the X-ray detector 118 refers to a component of the X-ray unit that is configured to detect the X-rays emitted by the X-ray source 116. The X-ray detector 118 is housed towards a middle of the cabinet 102. Optionally, the X-ray detector 118 can be located with an X-ray detector enclosure. Moreover, the specimen platform is configured to receive specimen for imaging purpose. Optionally, multiple lead sheets are arranged between an outer wall of cabinet 102 and the specimen platform. The multiple lead sheets serve as shielding to reduce radiation leakage associated with the X-rays emitted from the X-ray source 116.

In one embodiment, the X-ray detector 118 is implemented as charge integrating device, including but not limited to, a complementary metal-oxide-semiconductor (CMOS) device, direct or indirect detection flat panels (such as, a scintillator screen), amorphous silicon (a-Si) device, amorphous selenium (a-Se) device, charge-coupled devices (CCDs) and the like.

The system 100 further comprises a controller 120. The controller 120 can be implemented as any device, assembly, or part of an assembly that controls an operation such that the controller 120 receives input signals, processes the received input signals and generate output signals in response to the processed input signals. The controller 120 may be implemented such as to comprise a digital processor, a memory, an analogue circuit and/or a combination of the same. For example, the controller 120 can be implemented as integrated circuits included in a computer, a controller, a microcontroller, a microcomputer, a programmable logic controller, an application specific integrated circuit, an application-specific processor, digital signal processors, application specific integrated circuits, field programmable gate arrays and/or any other programmable circuitry. Such a control unit is capable of controlling, storing and/or processing data. The controller 120 is configured to control emission of X-rays from the X-ray source 116, subsequent collection and compilation of data received from the X-ray detector 118 as well as displaying of the resulting images on the display 114. The controller 120 is configured to selectively energize the X-ray source 116 to emit X-rays towards the specimen and the X-ray detector 118. The controller 120 further is configured to control the X-ray detector 118 to collect the X-rays that pass through the specimen when the X-ray source 116 is energized.

Generally speaking, the term 'controller' as used herein refers to a structure and/or module that includes programmable and/or non-programmable components configured to store, process and/or share information and/or signals for generating X-ray image of specimen. The controller 120 may have elements, such as a display, control buttons or joysticks, processors, memory and the like. Typically, the controller 120 is operable to perform one or more operations for managing one or more components of system 100. In the present examples, the controller 120 may be coupled with one or more components such as memory, a network adapter and the like, to store, process and/or share information with other computing components, such as, a remote server, a remote gateway, a network, or a database. Optionally, the controller 120 may be supplemented with additional computation system, such as neural networks, and hierarchical clusters of pseudo-analog variable state machines implementing artificial intelligence algorithms. Optionally, the controller 120 may be implemented as a computer program that provides various services (such as, database service) to other devices, modules or apparatuses. Examples of the controller 120 include, but are not limited to, a workstation, a desktop computer, a mobile computer, a laptop computer, a netbook computer, a tablet computer, a smart phone, a personal digital assistant (PDA), and the like.

In one embodiment, the X-ray unit comprises a swing arm operably coupled to the X-ray source 116. The swing arm is configured to change an orientation of the X-ray source 116 with respect to the X-ray detector 118. The controller 120 is coupled to the swing arm such that the swing arm and consequently, the orientation of the X-ray detector 118 can be arranged to monitor/analyse specimen from multiple angles to capture details, which may not be clearly elucidated from single angle.

Optionally, the controller 120 is configured to communicate with various components of the system 100 (such as the X-ray source 116 and the X-ray detector 118) in any suitable manner, including hardwired and wireless communication. For example, the controller 120 is configured to communicate the components of the system 100 over a wireless network, such as a Bluetooth, Local Area Network or the Internet.

Moreover, the controller 120 is configured to determine the density of different areas of the specimen from data collected from the X-ray detector 118. The X-ray detector 118 will generate respective digital signal for each pixel in a two-dimensional array. The size of the X-ray detector 118 may range, for example, from approximately 5.08×5.08 centimetres (cm) to approximately 40.64×40.64 cm and may preferably be approximately 12.7×8.24 cm. In one example, X-ray detector 118 is implemented as a rectangular array of approximately 836×1944 pixels, such that each pixel has a pixel size of 74.8 micrometres. Optionally, an image dataset obtained at each position may be processed either at a full spatial resolution of the X-ray detector 118 or at a lower spatial resolution by overlapping or binning a specified number of pixels in a single combined pixel value. In one example, binning at a 2×2 ratio enables to achieve an effective spatial resolution of approximately 149.6 micrometres. Such binning may be achieved by the X-ray detector 118 or by the controller 120.

The controller 120 is configured to create a density X-ray image of the specimen. The different areas of the specimen are indicated as a density or range of densities based on the determined density of different areas of the specimen. Also, the density X-ray image is colorized or greyscale. It will be appreciated that in a conventional X-ray or a radiograph image, only materials associated with five different densities can be detected for determining an abnormality within a specimen. Such materials include air, fat, soft tissue, bone and metal. Further, the material associated with very low density such as air is represented with the color black in conventional X-ray or radiograph images. Moreover, the material associated very high density such as metal (or a material having a contrasting density to air) is represented with the color white in conventional X-ray or radiograph images. Also, anatomical structures such as fat, soft tissue and bone are represented in varying shades of the color grey depending on density and thickness of the respective anatomical structure. Further, such conventional radiographic images are composed of a map of X-rays that have either passed freely through the specimen or have been variably attenuated (absorbed or scattered) by anatomical structures present within the specimen. Consequently, anatomical structures associated with denser tissues attenuate a higher number of X-rays than comparatively less dense tissues. For example, X-rays are attenuated more by bone tissue than by lung tissue. Moreover, contrast within the overall X-ray image also depends on differences in thickness of the anatomical structures. Consequently, a higher difference in the thickness of two adjacent anatomical structures leads to a higher contrast between the corresponding anatomical structures within the X-ray image.

It will be appreciated that an unexpected increase or decrease in the density of a known anatomical structure may be employed to detect an abnormality, such as, by determining a tissue structure of the abnormality. The controller 120 is configured to employ artificial intelligence algorithms or AI module to determine density (based on X-ray) and varying shades of the color grey of a conventional X-ray image as an input and subsequently, interpolate them using a specific color palate or greyscale such that the different colors of the color palate or intensities of the grey respectively indicate different densities or a range of densities of anatomical structure of the specimen. For example, the controller 120 is configured to replace a scalar value representing an intensity value of pixel with a vector in the color palate. Such an interpolation of the shades of grey of conventional X-ray images into different colors or intensities of grey enables medical professionals (such as surgeons and doctors) to quickly and easily detect and understand presence or absence of abnormalities in the anatomical structure of the specimen because changes in color can be quickly and more easily perceived than changes in shades of grey as in conventional X-ray images. Further, the interpolation will enable experienced medical professionals to accurately detect and understand the presence or absence of abnormalities because the mapping between the intensity value of various pixel and colors will become memorized to the medical professionals through regular usage of the system 100.

The term 'AI module' as used herein refers to a structure and/or module that includes programmable and/or non-programmable components configured to store, process and/or share information and/or signals for managing healthcare records of a user. The AI module is operable to perform one or more operations of controller 120. In the present examples, the AI module may include components such as memory, a processor, a network adapter and the like, to store, process and/or share information with other computing components, such as, a remote server, a remote gateway, a network, or a database. The AI module may communicate with the one or more external computing devices using one or more adequate or suitable communication links, at least some of which are wireless and/or cellular links of any suitable type connecting the AI module to a communication network (not shown), or to other AI modules running in the edge of the communication network such as, Access Points or Evolved Node B (eNB) or others in the cellular infrastructure, or other higher IP communication layers. Notably, the AI module(s) may be based on any suitable mechanism or algorithm or paradigm or method, including, for example: deep learning, machine learning, a Neural Network (NN), deep learning, supervised learning, unsupervised learning, reinforced learning, heuristic based or assisted decisions (sometimes, not referred to as AI at all) or a combination of any of these or other decision-making methods, including human-assisted decisions.

In one or more embodiments, the X-ray source 116 emits a first amount of X-rays and the X-ray detector 118 includes a plurality of pixels in an array. Further, each pixel is configured to detect a second amount of X-rays. The controller 120 creates the density X-ray image from the plurality of pixels by comparing from the first amount of X-rays and the second amount of X-rays for each pixel in the array. The controller 120 is configured to employ an algorithm to record a magnitude (or intensity) of each pixel of the X-ray detector 118 that is associated with a detected X-ray. Subsequently, the controller 120 is configured to employ the magnitude (or intensity) of the corresponding X-ray emitted from the X-ray source 116 to calculate a difference in magnitude between the X-ray emitted from the X-ray source 116 and the X-ray detected by the X-ray detector 118. Optionally, the controller 120 can employ the algorithm to use information corresponding to the difference for each pixel of the X-ray detector 118 to produce an image in which a quantity of the difference in magnitude at each pixel is assigned a specific color (or a particular shade of a color) or greyscale intensity, thereby, producing the image showing the colors, shades of the color or intensities of greyscale for different densities or range of densities for various parts of the specimen. For example, the controller 120 is configured to employ the algorithm to process the data such that the algorithm generates a color image can generated that shows muscle, bone, water, fat and disease markers within the specimen. Consequently, multiple objects of different materials having similar density can be distinguished from each other.

In one or more embodiments, the controller 120 is configured to employ a difference in X-ray magnitude of a pixel from multiple two-dimensional X-ray images of a same area of a specimen to generate a colorized tomosynthetic image denoting various densities of the specimen. The specimen platform is configured for any organic or inorganic specimen that fits inside the cabinet The controller 120 is configured to selectively display the density X-ray image of the specimen on the display 114. The density X-ray image of the specimen can be viewed in real-time or saved for future examination in various formats. It will be appreciated that the images may be transmitted via a universal serial bus (USB) drive, Ethernet, Wi-Fi, and the like in various formats that may include Digital Imaging and Communications in Medicine (DICOM), .tiff. or .jpeg and so forth.

In one or more embodiments, the different areas of the specimen of the density X-ray image are displayed in different greyscale, distinct color or different shades of color. The controller 120 is configured to depict the different densities of the specimen and assigning a color to each of the analysed densities. For example, the controller 120 is configured to cause emission of X-rays from the X-ray source 166 towards the specimen and measuring their magnitude (or intensity) after the X-rays have passed through the specimen using the X-ray detector 118. In one example, the X-ray detector 118 can comprise a two-dimensional array of pixels to detect X-rays emitted from the X-ray source 116 and that have passed through the specimen. Further, some of the pixels of the two-dimensional array of pixels of the X-ray detector 118 will be associated with detection of X-rays while other pixels may not be associated with detection of X-rays, such as, due to scattering or absorption of the emitted X-rays by the specimen. Moreover, denser materials such as bone or tumour (e.g., densely packed cells) that attenuate the X-rays more than soft tissues will be represented as flat and monochrome regions within the colorized image. Alternatively stated, time required to travel X-ray photon particle through different density material would be different. As a result, time of flight (TOF) of each X-ray photon, that may reach to X-ray detector 118, can vary depending on the density of tissue region. Thus, the present disclosure enables efficient discrimination of density of specimen based on calculation of TOF. Optionally, the detector 118 is configured to measure attenuation of X-rays associated with specific wavelengths as they pass through different materials.

Figure 2A:
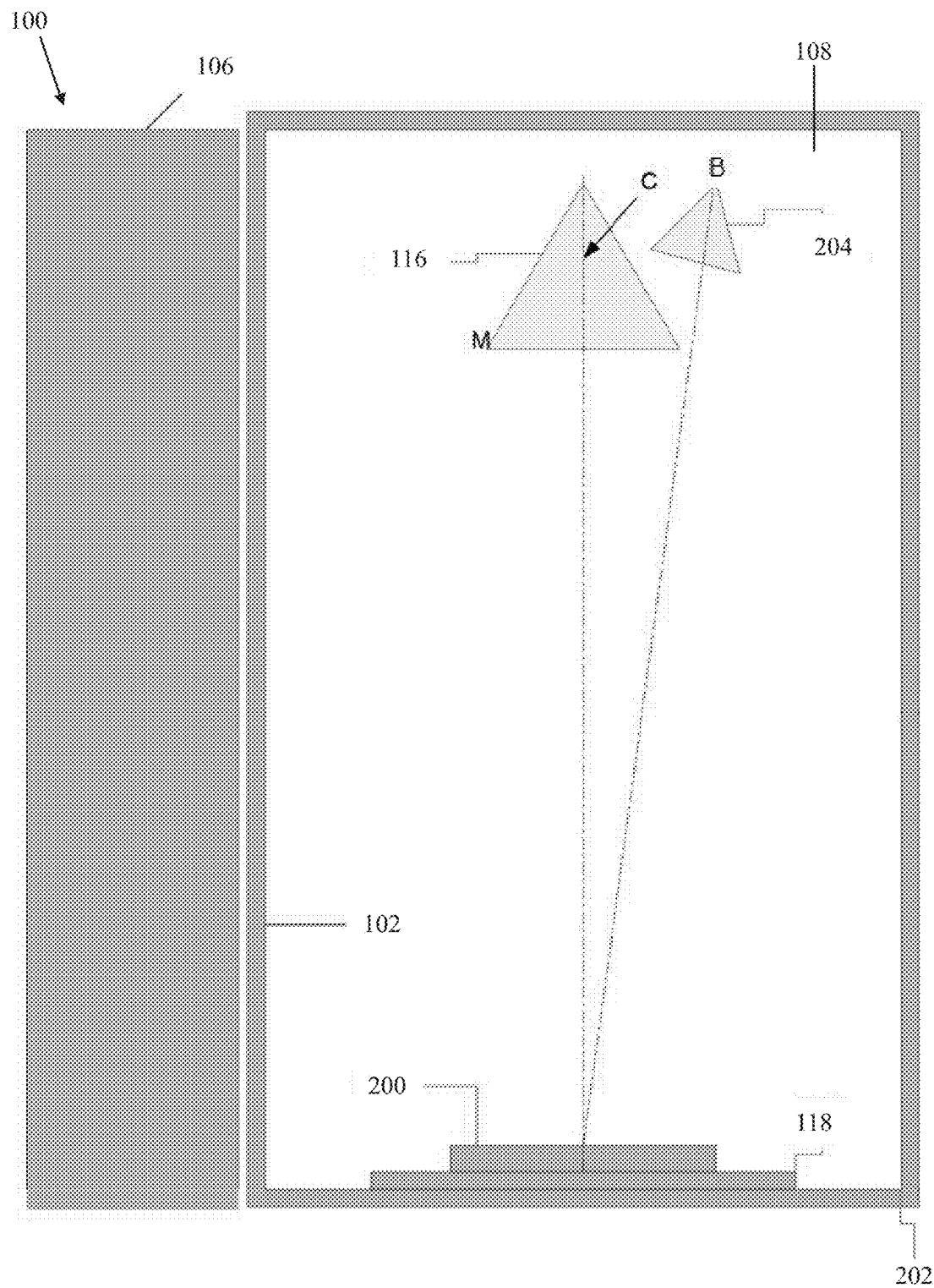
FIG. 2A is a schematic depiction of X-ray system for radiography from a single position of X-ray source, in accordance with an embodiment of the present disclosure.

FIG. 2A is a schematic depiction of X-ray system for radiography from a single position of X-ray source, in accordance with an embodiment of the present disclosure. As shown, the X-ray source 116 is located at an orientation of 0° with respect to the sampling platform 200 on which the sample is arranged. Optionally, the X-ray source 116 can be configured to move from a back of the cabinet 102 towards a front of the cabinet 102. Further, the X-ray detector 118 is disposed behind the sampling platform 200, such as, on a base 202 of the cabinet 102. Optionally, the X-ray source 116 can be configured to cause emission of X-rays with a spread of 0 kVp to approximately 50 kVp. For example, the system 100 may employ automatic exposure control (or AEC) to ascertain an optimal setting for each specimen. In an embodiment, the X-ray source 116 can be configured to rotate 360° with respect to specimen. So that specimen can be analysed from multiple angles. Alternatively stated, the X-ray source 116 can be mounted on a robotic arm having three degrees of freedom to analyse specimen in multiple view angles. As X-ray source 116 rotates, the X-ray detector 118 also repositions to capture X-ray photons. In one or more embodiments, various elements of system 100 can be enclosed or housed in X-ray cabinet 102. The X-ray source 116 may be arranged to bombard specimen within X-ray beam (denoted as "c") from multiple angles. X-ray beam can be widen using known device "M" (e.g., Collimator, diffraction gratings, crystal etc.) to expose entire surface of specimen.

Figure 2B:
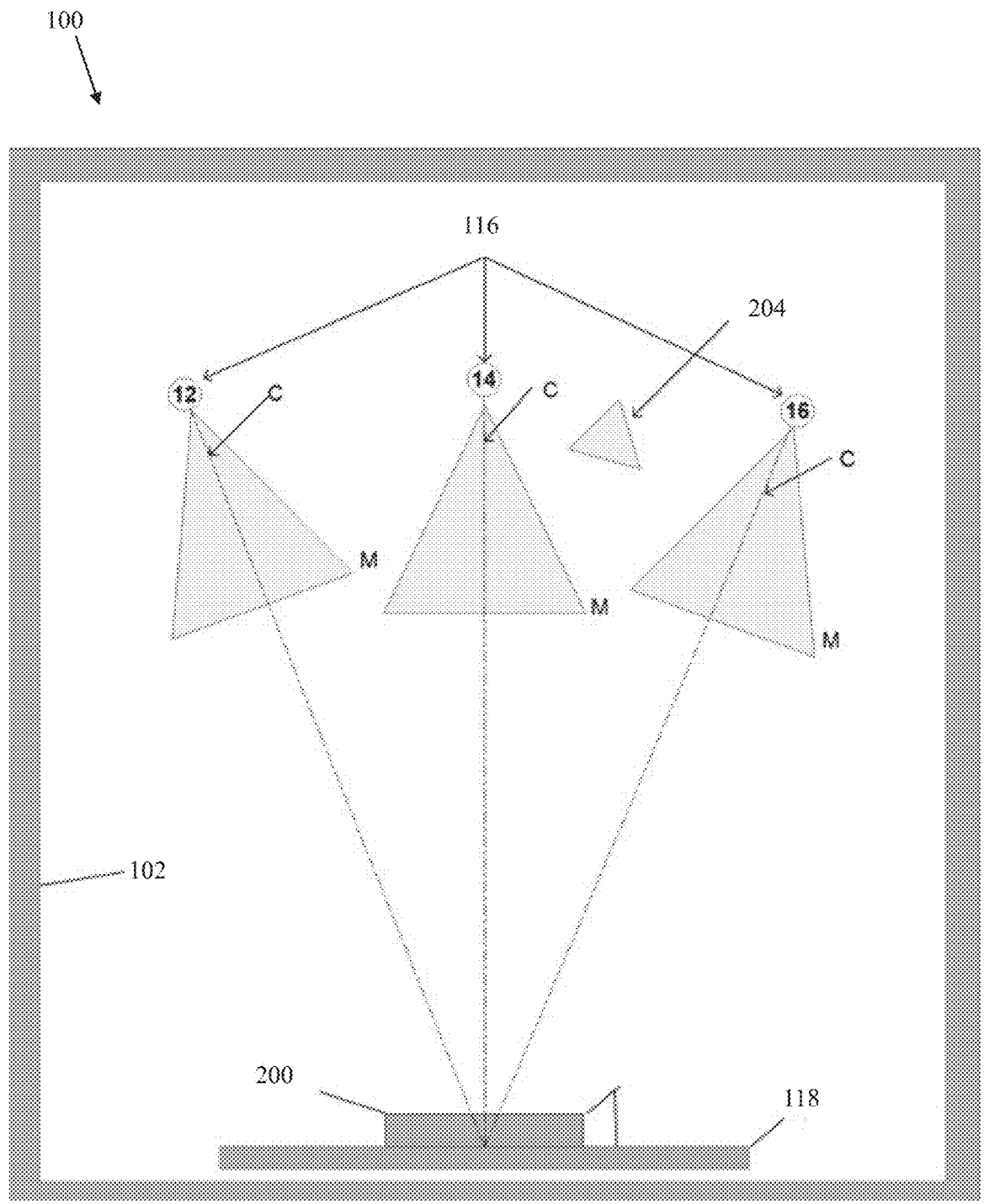
FIG. 2B is a schematic depiction of X-ray system for radiography from multiple positions of X-ray source, in accordance with an embodiment of the present disclosure.

FIG. 2B is a schematic depiction of X-ray system for radiography from multiple positions of X-ray source, in accordance with an embodiment of the present disclosure. The X-ray source 116 can be coupled to the swing arm that can be arranged to orient the X-ray detector 116 at different positions (e.g., 12, 14 and 16). The X-ray detector 118 can be arranged to receive X-ray from distinct angles to capture details of specimen, which may not be clearly depicted from single angle.

As shown, the system 100 includes an optical camera 204 configured to capture an optical image of the specimen. The terms "camera" or "optical camera" as used herein throughout the disclosure refers to an optical instrument for capturing images in black and white, greyscale or color (preferably color) using reflected and/or emitted wavelengths of the electromagnetic spectrum, for example, visible light or fluorescent light, from an object, similar to a photograph or that which could be viewed by a human eye, using an electronic light-sensitive sensor array. These terms may include such instruments producing images in standard resolution or high definition as well as a digital camera that can directly capture and store an image in computer-readable form using an array of electronic light-sensitive elements, such as, semiconductor photo-sensors that produce a light-intensity-dependent electronic signal in response to being illuminated. The optical camera 204 may be employed to capture an optical image (for example, in black and white, greyscale or preferably, in color), preferably in real-time of the specimen utilizing a multi-spectral source to produce an X-ray image. In a preferred embodiment, the optical camera 204 is a high-definition (HD) optical camera that is configured to capture an HD optical image and X-ray image in either a pixelated form utilizing a standard X-ray detector or a photon-counting X-ray detector to display the captured images in greyscale or color. For example, the photon-counting X-ray detectors can include, but is not limited to, a photomultiplier, a Geiger counter, a single photon avalanche diode, a superconducting nanowire single-photon detector, a transition edge sensor, a scintillation counter and a charge-coupled device. Optionally, hybrid photon-counting technology using complementary metal-oxide semiconductor (CMOS) or other application-specific integrated circuit (ASIC) technologies can also be employed.

Further, the controller 120 is configured to control the optical camera 204 to capture and collect the optical image of the specimen and selectively display the density X-ray image and the optical image of the specimen on the display. The X-ray image can include a two-dimensional X-ray image or a synthetic X-ray image assembled from more than one X-ray image (such as a tomosynthetic image). It will be appreciated that gain on a camera represents a conversion factor from electrons (e−) into digital counts. Such a gain is expressed as the number of electrons that get converted into a digital number or electrons per analog-to-digital (e−/ADU). Consequently, the cabinet X-ray system 100 operates by analysing the ADU units that constitute all images whether they be radiographs or photographs. The controller 120 can minutely compare the differences between neighbouring pixels in terms of magnitude and succinctly assigns a color, shade of color or greyscale intensity to each density or range of densities after assigning a color or greyscale for full black and full white.

In one or more embodiments, the controller 120 is configured to distinguish among different materials of the specimen by training or employing an artificial intelligence algorithm. For example, the controller 120 is configured to analyse kVp (to tube voltage), mA (exposure time product) and filtration. The controller 120 can also be configured such that the kVp and mA can be adjusted to control image quality and patient dose. It will be appreciated that the artificial intelligence algorithm would have to be accordingly trained. Further, the artificial intelligence algorithm would record the ADU for each material in the specimen and by utilizing a table or other list in the memory of the controller 120, discern the different materials constituting the specimen.

In one or more embodiments, the captured camera optical image may be displayed on the display 114 as an overlaid or blended or combined image. Such a overlaid or blended or combined image can be a resultant colorized or greyscale density X-ray image or synthetic X-ray image assembled from more than one X-ray image of the specimen. Further, the overlaid or blended or combined image can be displayed on the display 114 for back-to-back viewing between other such images, for side-by-side viewing or in picture-in-a-picture (PIP) format including other X-ray images or synthetic X-ray images of the specimen. Such implementation of the system 100 displays both the X-ray image and the optical image of the specimen in real-time to facilitate confirmation and orientation for medical professionals, to verify that margins and other specimen features are achieved by the medical professional after their respective removal from a patient.

Figure 3:
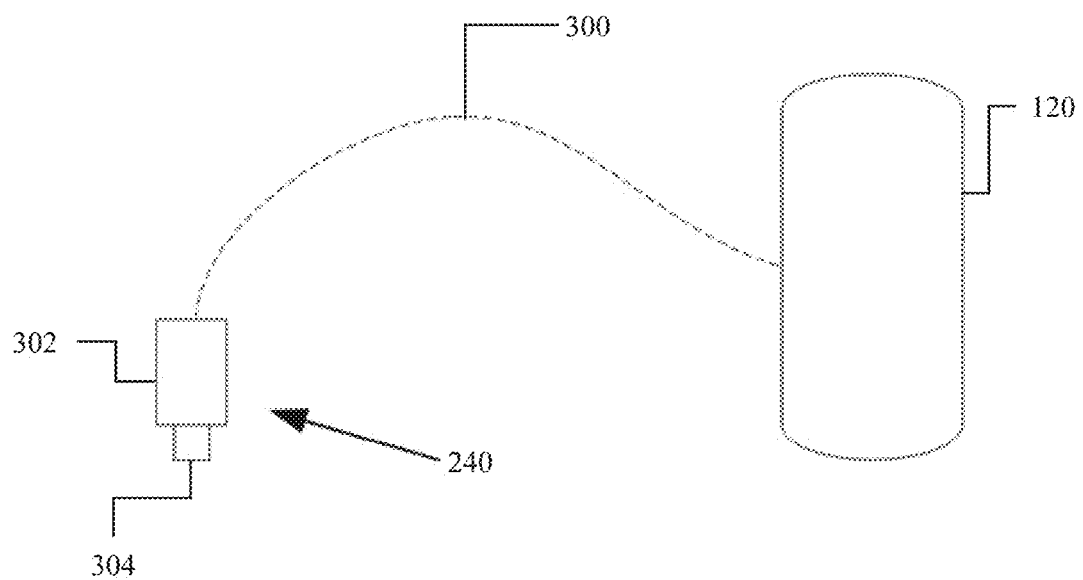
FIG. 3 is an exemplary schematic diagram to depict a connection between the optical camera and a controller, in accordance with an embodiment of the present disclosure.

Referring now to FIG. 3, there is shown an exemplary schematic diagram to depict a connection 300 between the optical camera 240 and the controller 120 of FIGS. 1 and 2, in accordance with one or more embodiments of the present disclosure. The optical camera can preferably be implemented as a real-time camera that is configured to capture an optical image of the specimen concurrently or at substantially the same time as acquisition of an X-ray image. The optical camera 240 can incorporated into a cabinet of X-ray unit (such as the cabinet 102 of FIGS. 1 and 2). Further, the optical camera 240 is operably coupled to the controller 120 using a cable 300, for example, a USB cable to enable the controller 120 to control operation of the optical camera 240. It will be appreciated that other wired or wireless connections, for example, a Bluetooth connection, between the optical camera 240 and the controller 120 are also possible without departing from a scope of the present disclosure. As shown, the optical camera 120 can include an optical lens assembly 302 through which an optical image passes and is focused upon an electronic light-sensitive sensory array included in body 304 of the optical camera 240. The optical image can then be sent using an electronic signal from the sensory array to the controller 120 via the cable 300 or another wireless connection. The optical image as well as a two-dimensional X-ray image or tomosynthesis image can also be stored in the controller 120 for future examination and viewing, including storage in memory (for example, random access memory) or a disc-based recording medium (for example, a compact disc, digital versatile disc and the like). Alternatively, the image can be stored in a separate memory device, such as for example, a separate hard drive, flash drive, CD-ROM, DVD, etc. for further analysis.

In one embodiment, the displayed density X-ray image and the optical image of the specimen are overlaid. The generated density X-ray image and the optical image can each be displayed individually, together in an overlaid or blended manner, adjacently to each other or in a PIP format on the display (such as the display 114 of FIG. 1). Consequently, the system 100 provides more flexibility to a medical professional or another user of the system 100. The separate images from the optical camera 240 and the X-ray detector 118 can be displayed separately as well as the tomosynthetic, overlaid or blended, adjacent and PIP images can be stored in hard drive of a computer or a separate memory device, such as for example, a separate hard drive, flash drive, compact disc, digital versatile disc and the like for future analysis. The optical camera can capture a visible light or other electromagnetic wavelength reflected or emitted by the specimen or portions thereof, for example, through the use of fluorescent or other markers using a suitable light source where required. Further, manual input for operation of the cabinet X-ray system 100 may be initiated via keyboard or monitor touchscreen and the resulting image from the manual-initiated examination can be displayed on the display 114.

Figure 4:
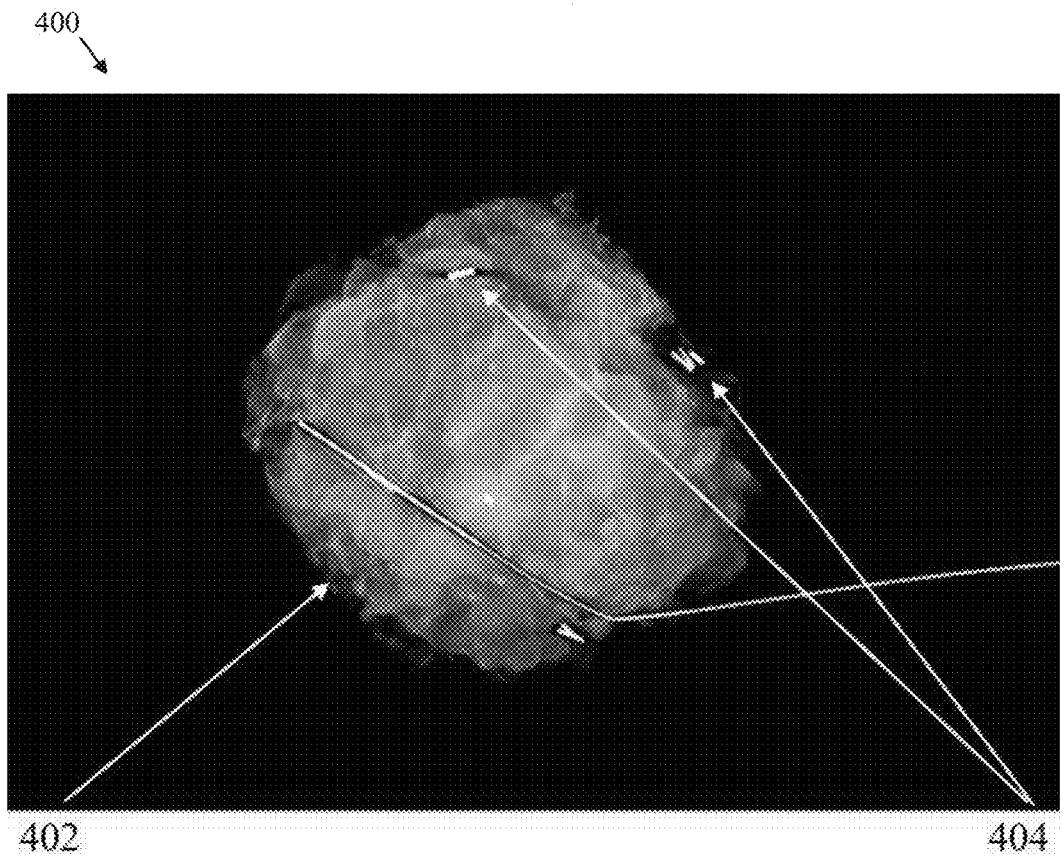
FIG. 4 is a diagram illustrating an exemplary greyscale X-ray image of a breast specimen, in accordance with an embodiment of the present disclosure.

Referring to FIG. 4, there is shown a diagram illustrating an exemplary greyscale X-ray image 400 of a breast specimen, in accordance with one or more embodiments of the present disclosure. As shown, the image 400 is produced directly from X-ray source and X-ray detector (such as the X-ray source 116 and X-ray detector 118 of FIGS. 1 and 2). Additionally, the blend/overlaid/blended image of the X-ray image can be overlaid/blended/blended onto the optical image of the specimen to show: (a) the actual placement of the markers 404, (b) orientation of the specimen 402, and (c) placement of the markers 404 within the breast specimen. Markers 404 can be utilized to delineate the outer boundaries of the suspect area that needs to be excised in the X, Y, and Z directions. The markers 404 may include radioactive seeds, coils, wires, and/or radiopaque/visible items which can be injected/implanted before the surgical procedure, by an interventional radiologist, and are utilized to denote boundaries of the region of interest.

Figure 5:
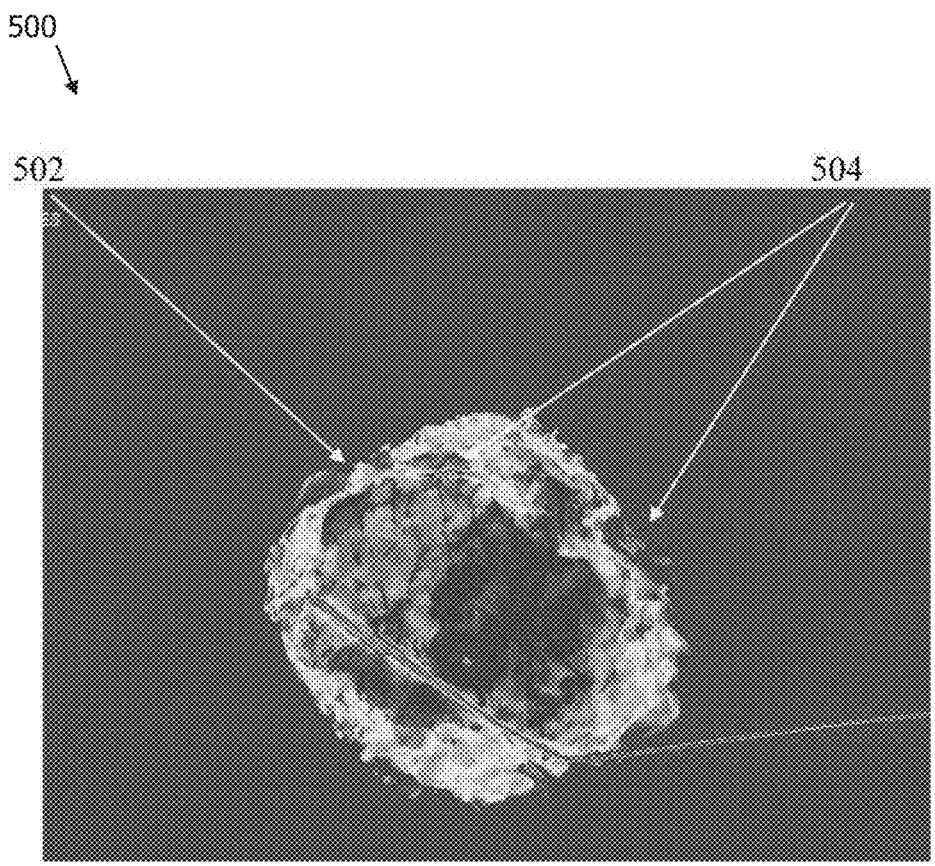
FIG. 5 is an illustration of an exemplary colorized X-ray image of a breast specimen, in accordance with an embodiment of the present disclosure.

Referring now to FIG. 5, illustrated an exemplary colorized density X-ray image 500 corresponding to the greyscale X-ray image 400 of FIG. 4, in accordance with one or more embodiments of the present disclosure. The colorized density X-ray image 500 is produced after a controller (such as the controller 120 of FIG. 1) has analysed different densities or ranges of densities and has assigned a color to them. As shown, the image 500 is colorized with various shades of red being the densest areas going to white being the least dense. Further, blue and purple areas are displayed in varying intensities to convey differences in densities of the specimen to the medical professional (such as a surgeon or other medical doctor) viewing the image. FIG. 5 illustrates breast specimen 502 and markers 504.

Figure 6:
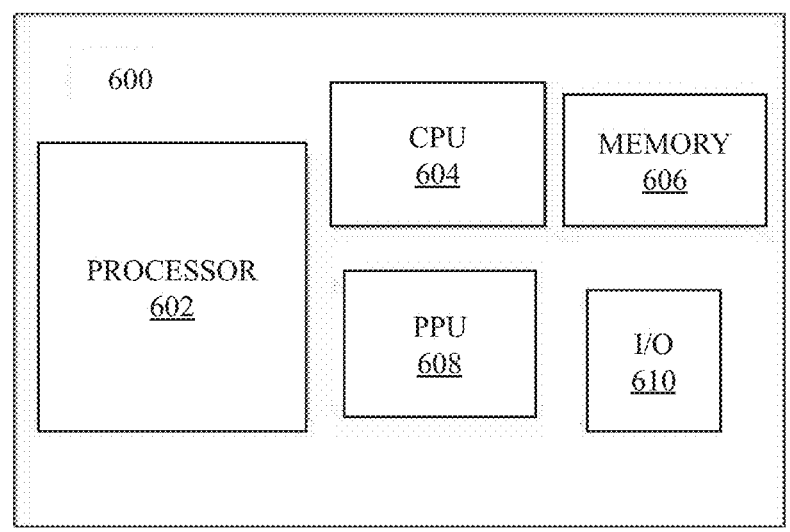
FIG. 6 illustrates an exemplary schematic diagram of X-ray detector, in accordance with an embodiment of the present disclosure.

Referring now to FIG. 6, exemplifies a schematic diagram of X-ray detector 600 (such as the X-ray detector 118 of FIG. 1), in accordance with one or more embodiments of the present disclosure. As shown, the X-ray detector 600 includes a processor 602. Consequently, the X-ray detector 600 can be implemented as a digital detector configured to collect X-ray images of breast specimen radiograms. In one example, the breast specimen radiograms can be tomosynthesis specimen radiogram. Such breast specimen radiograms may be received from a tomosynthesis specimen radiographic system and subsequently, the received radiograms can be entered inputs to the cabinet system 100. Optionally, the processor 602 is configured to perform image processing, for example, parallel processing of images. In one embodiment, the X-ray detector 600 includes a central processing unit (or CPU) 604, a memory 606, a parallel processing unit (or PPU) 608, and an input/output (or I/O) unit 610. The CPU 604 is configured to perform manipulation (such as, by processing) of the data. The memory 606 is configured to perform temporary storage and manipulation of the data as well as storage of algorithms and other software necessary for operation of the X-ray detector 600. The PPU 608 is configured to perform simultaneous calculation, such as, calculation of X-rays detected by the X-ray detector 600. The I/O unit 610 is configured to control data input to the X-ray detector 600 as well as the resulting output. It will be appreciated that the PPU 608 can be replaced by a single processor. Optionally, the processor 602 is configured to perform various other image processing functions serially or in parallel in addition to the processes described hereinabove.

Figure 7:
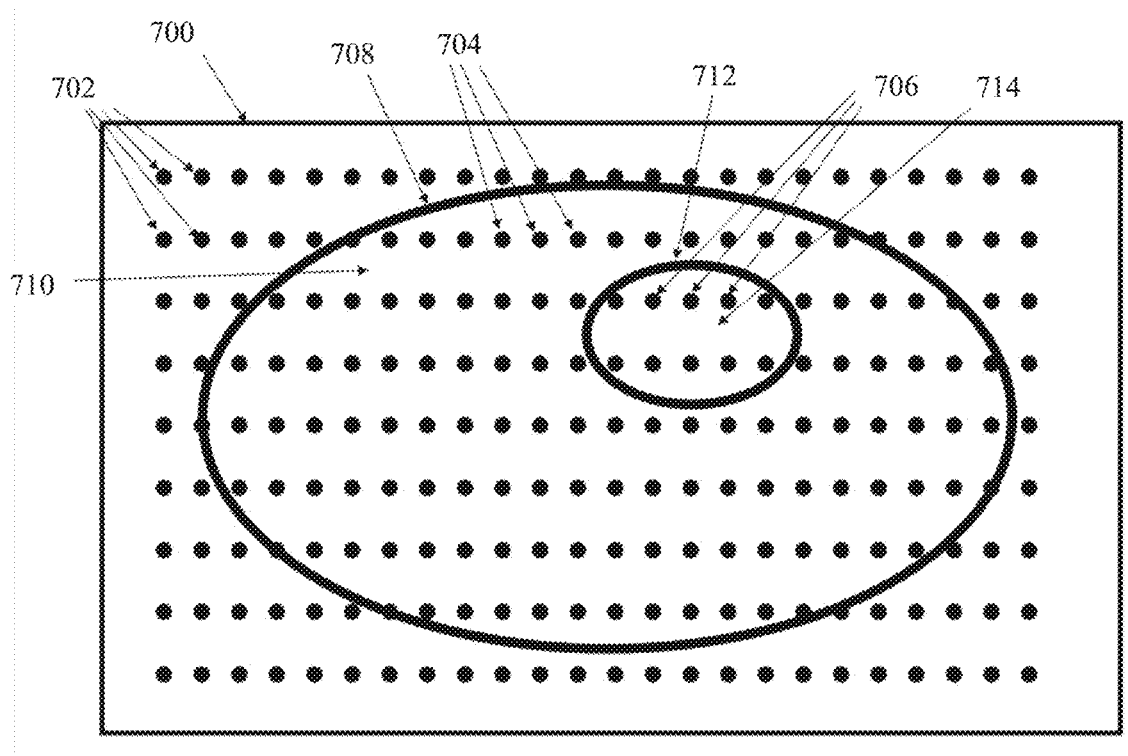
FIG. 7 illustrates a top view of X-ray detector, in accordance with an embodiment of the present disclosure.

Referring to FIG. 7, depicts a top view of an X-ray detector 700 (such as the X-ray detector 118 of FIG. 1), in accordance with one or more embodiments of the present disclosure. The X-ray detector 700 comprises pixels 702, 704 and 706. Further, a specimen 708 is arranged either directly or indirectly (for example, on a cover) on the X-ray detector 700. Further, upon exposure of the X-ray detector 700 and the specimen 708 to X-rays emitted by an X-ray source or X-ray sources, the pixels 702, 704 and 706 detect the magnitude (or intensity) of the X-rays. As shown, the specimen 708 includes an area 710 having a particular density and a subarea 714 within area 712 having a different density. The pixels 702 will detect the incoming X-rays as being unaffected (or unattenuated). Further, the pixels 704 will detect the incoming X-rays as being effected (or attenuated) by the density of area 710. The pixels 708 will detect the incoming X-rays as being effected (or attenuated) by the density of area 710.

Figure 8:
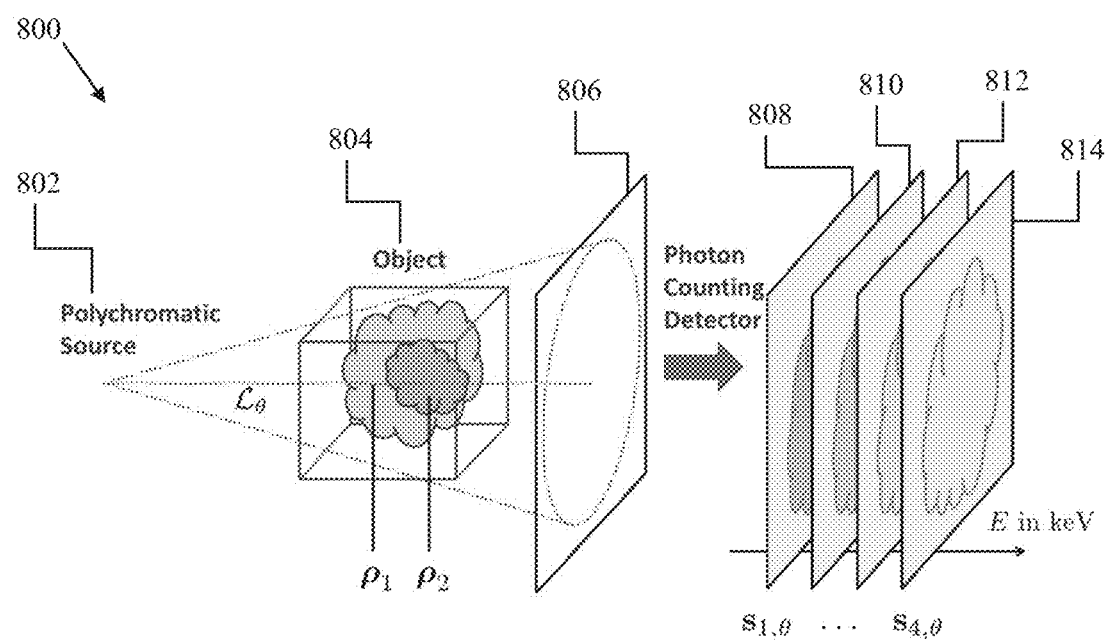
FIG. 8 illustrates an exemplary detailed view of cabinet X-ray image system, in accordance with an embodiment of the present disclosure.

Referring now to FIG. 8, exemplifies detailed schematic view of a cabinet X-ray image system 800, in accordance with one or more embodiments of the present disclosure. As shown, the system 800 comprises an X-ray source 802 (polychromatic X-ray source) that emits a multi-spectral waveform onto the object/specimen 804 that is captured by the photo counting detector 806. Further, a resulting compilation of the photon counts associated with the differing densities are exhibited by 808, 810, 812 and 814 going from the least dense to the densest. Moreover, a pre-set energy threshold allows to capture just one part of the X-ray spectrum. It will be appreciated that a difference in the densities can change by changing the threshold. Alternatively, time required to travel X-ray photon particle through different density material (denoted as $\rho 1$ and $\rho 2$) may vary. As a result, time of flight (TOF) of each X-ray photon to reach to X-ray detector 118 may vary, depends on the density of tissue region. Thus, the present disclosure enables efficient discrimination of density of specimen based on calculation of TOF. Based on TOF data, the controller 120 (not shown) may generate X-ray images (e.g., 808, 810, 812 etc.) corresponding to different plane of specimen. Thus, TOF based X-ray image may provide detailed information without dissecting tissue specimen.

Figure 9:
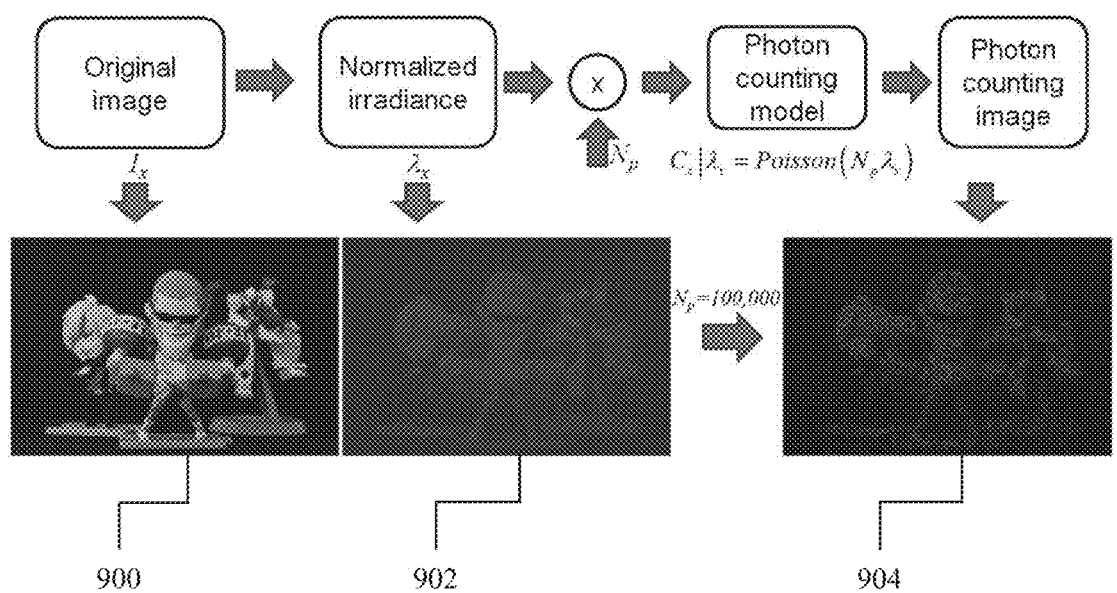
FIG. 9 depicts various phases of X-ray image processing, in accordance with an embodiment of the present disclosure.

Referring to FIG. 9, there are shown three phases 900-904 of an image that is manipulated by a controller (such as the controller 120 of FIG. 1), in accordance with one or more embodiments of the present disclosure. The three phases 900-904 of the image comprise a standard HD image 900, a standard radiograph 902 and a pixilated photon-counted image 906. As shown, when the standard HD image 900 is converted to the standard radiograph 902, depth information within the standard radiograph 902 is lost due to conversion of various colors within the standard HD image 900 to the colors black, white and grey (different shades of grey) within the standard radiograph 902. However, conversion of the standard HD image 900 to the pixilated photon-counted image 906 provides higher depth information. As shown, pixels of multiple characters shown in the pixilated photon-counted image 906 are clearly discernible against black background. Such a pixilated image enables to conveniently identify regions of interest within the pixilated photon-counted image 906 compared to the standard radiograph 902 that only comprises the black background and various shades of grey.

Figure 10:
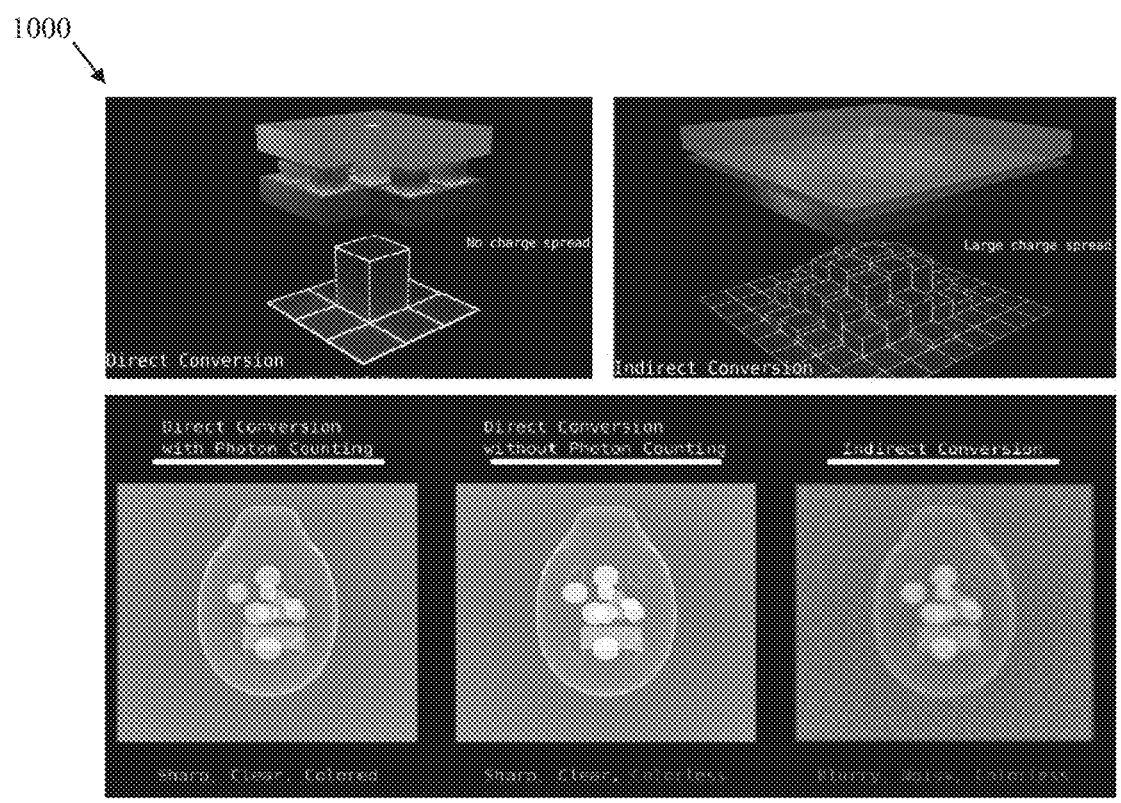
FIG. 10 shows a comparison of X-ray images generated through different techniques, in accordance with an embodiment of the present disclosure.

Referring to FIG. 10, there is shown a comparison 1000 of X-ray images generated through different techniques, in accordance with one or more embodiments of the present disclosure. As shown, the photon-counting detector captures more information at higher resolution as compared to the image captured by the conventional X-ray detector. First segment (in second row) of FIG. 10 depicts that highest or optimal image resolution can be achieved by utilizing photon counting with a direct conversion detector. Second segment represents image captured with conversion detector and without integration of photon counter data. The third image shows unsharp or blurred image that can be generated with an in-direct conversion detector.

Figure 11:
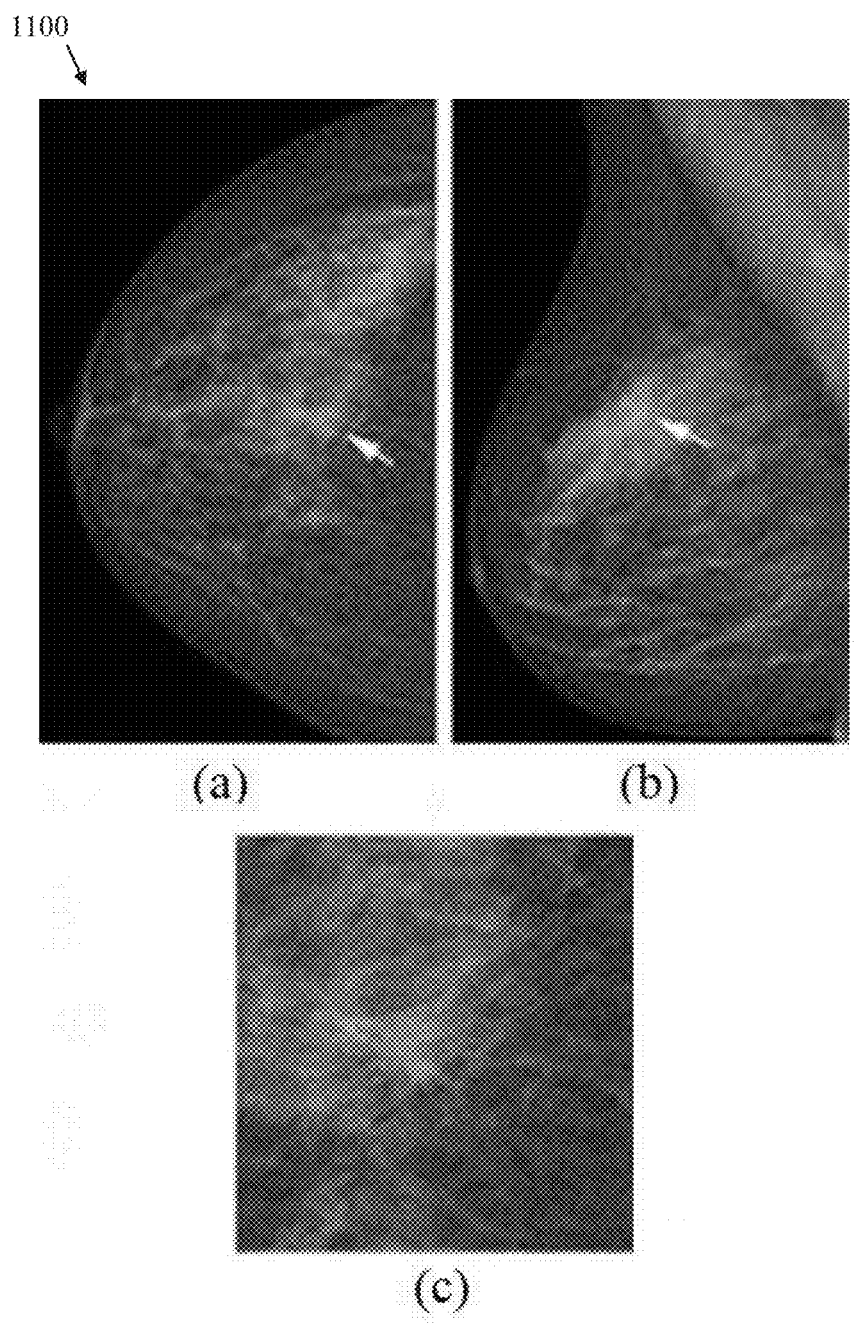
FIG. 11 is exemplary X-ray images of breast, in accordance with an embodiment of the present disclosure.

Referring to FIG. 11, there are shown exemplary X-ray images 1100 of breast, captured using photon-counting in mammography, in accordance with one or more embodiments of the present disclosure. The images 1100 comprise two-view screening mammograms obtained with the photon-counting system by Direct Conversion®. As shown, the images 1100 show a spiculated mass in right-upper quadrants (illustrated by white arrow). Such diagnosis is associated with invasive ductal carcinoma, 8 mm in diameter. The images 1100 show (a) right craniocaudal image, (b) right mediolateral oblique image, and (c) zoomed in craniocaudal image of the lesion.

Figure 12:
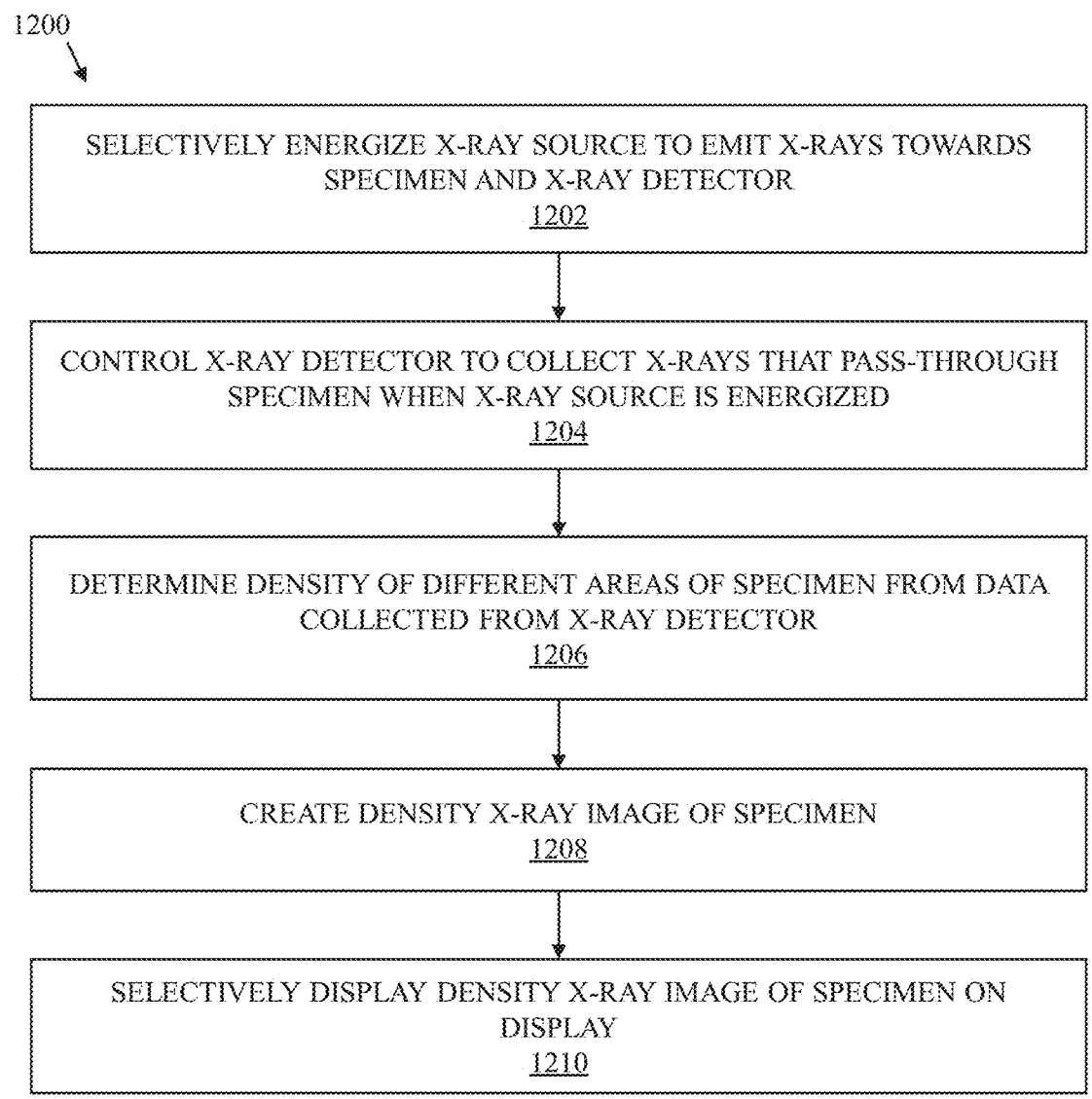
FIG. 12 shows a schematic diagram illustrating an exemplary workflow involved in the method for obtaining colorized or greyscale density X-ray images of a specimen using a cabinet X-ray image system, in accordance with an embodiment of the present disclosure.

Referring to FIG. 12, a schematic diagram illustrating an exemplary workflow involved in the method for obtaining colorized or grey scale density X-ray images of a specimen using a cabinet X-ray image system, in accordance with one or more embodiments of the present disclosure. As shown, the method 1200 comprises the steps 1202, 1204, 1206, 1208 and 1210. The listed steps 1202, 1204, 1206, 1208 and 1210 may not necessarily be performed in sequential order.

At step 1202, the method 1200 comprises, selectively energizing X-ray source ((such as the X-ray source 116) to emit X-rays towards the specimen and the X-ray detector (such as X-ray detector 118). The controller 120 may activate X-ray source 116 through enabling supply of electric energy to X-ray source 116 (form appropriate energy supply device such as battery). Before activation of X-ray source 116, controller 120 may check opening status of door 106. If door 106 found to be in an open state, controller 120 may prevent activation of X-ray source 116 to prevent leakage of X-ray in surround ambiance to provide protection to operator, who place the specimen to sample sampling platform 200.

At step 1204, the method 1200 comprises controlling the X-ray detector 116 to collect X-rays that pass through the specimen when the X-ray source 116 is energized. Upon activation of X-ray source 116, high energy X-ray photon can be bombarded towards specimen that partially inhibit free travel of X-ray photon towards X-ray detector 118. As specimen is made of different material (e.g., fat, bone, muscle, blood vessels) or packed with variable cell density, bombarded X-ray photon may attenuated variably depending on area/zone of specimen through which x-ray photon travelled. Thus, X-ray detector 116 may comprise array of pixels which arranged to collect the X-ray photons, which can be categorized in a first category of photon (which did not pass through specimen) and a second category (which passed through specimen). As X-ray detector 118 is implemented as 2D array of pixel, location of each first category of photon would enable generation of counter corresponding to shape of specimen.

At step 1206, the method 1200 comprises, determining the density of different areas of the specimen from data collected from the X-ray detector 118. The controller 120 may configured to utilize data of X-ray detector 116 to determine TOF, attenuation level or change in intensity to determine density level. For example, lower intensity level may be correlated with higher density area and vice-a-versa. Variable TOF may depending on density as denser object (e.g., cancerous part of specimen) would higher delay passage of x-ray photon this results in higher TOF and less denser object (e.g., blood vessel of specimen) would have lower TOF. Thus, controller 120 may determine density of specimen placed on sampling platform 200.

At step 1208, the method 1200 comprises creating a density X-ray image of the specimen. The different areas of the specimen are indicated as a density or range of densities based on the determined density of different areas of the specimen. Further, the density X-ray image is colorized or greyscale. The controller 120 may utilize determined density data and assigned color scheme depending on density. For example, controller 120 may assign a first color to higher dens region and a second color to least dens material and vary hue or intensity to depict density over space of specimen.

At step 1210, the method 1200 comprises displaying the density X-ray image of the specimen is selectively displayed on the display 114. The controller 120 may annotate image with an identifier code of sample. In a further embodiment, the different areas of the specimen are displayed in different greyscale, different color or different shades of color. The color selection can be provided by healthcare professionals or controller 120 can access user profile (i.e., preferred color scheme that can be dependent on specimen type) or organization preference or default parameters set by manufacturer.

The steps 1202 and 1210 are only illustrative and other alternatives can also be provided where one or more steps are added, one or more steps are removed, or one or more steps are provided in a different sequence without departing from the scope of the claims herein.

In one or more embodiments, the method 1200 further configuring an optical camera (such as, optical camera 240) configured to capture an optical image of the specimen. The controller (such as, controller 120) can further configured to control the optical camera system to capture and collect the optical image of the specimen and selectively display the density X-ray image and the optical image of the specimen on the display. Further, the optical camera can be operably coupled to the controller 120, through wired or wireless network to enable the controller 120 to control operation (i.e., activation, deactivation, change resolution, shutter speed, mode of camera and the like) of the optical camera.

In one or more embodiments, the method 1200 further comprises displaying density X-ray image and the optical image of the specimen are overlaid. The controller 120 may render a graphical user interface onto the display 114 for simultaneous display of X-ray image and optical image. These two images can be display as side-by-side, overlay to each other or PIP format or any other user defined/preferred arrangement. Moreover, healthcare professionals may provide input through input means (such as mouse, microphone) to enable interactive (such as zoom in or zoom out) sessions.

In one or more embodiments, the method 1200 further comprises step of performing photon-counting operation through the X-ray detector (such as X-ray detector 116) that can be selected from a photomultiplier, a Geiger counter, a single-photon avalanche diode, a superconducting nanowire single-photon detector, a transition edge sensor, a charge coupled device (CCD) X-ray detector, a scintillation counter and a hybrid pixel photon-counting detector. Upon collision of photon with pixel of X-ray detector, electrical charge can be generated. The generated charge would be quantified with a suitable mechanism. This technique would result in improvement in spatial resolution during the imaging of specimen and also allow imaging at lower dose.

The present disclosure also provides a computer-readable storage medium comprising instructions which, when executed by a computer, cause the computer to carry out the steps of the method 200 for managing the healthcare records of the user. Examples of implementation of the non-transitory computer-readable storage medium include, but is not limited to, Electrically Erasable Programmable Read-Only Memory (EEPROM), Random Access Memory (RAM), Read Only Memory (ROM), Hard Disk Drive (HDD), Flash memory, a Secure Digital (SD) card, Solid-State Drive (SSD), a computer readable storage medium, and/or CPU cache memory. A computer readable storage medium for providing a non-transient memory may include, but is not limited to, an electronic storage device, a magnetic storage device, an optical storage device, an electromagnetic storage device, a semiconductor storage device, or any suitable combination of the foregoing.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural. The word "exemplary" is used herein to mean "serving as an example, instance or illustration". Any embodiment described as "exemplary" is not necessarily to be construed as preferred or advantageous over other embodiments and/or to exclude the incorporation of features from other embodiments. The word "optionally" is used herein to mean "is provided in some embodiments and not provided in other embodiments". It is appreciated that certain features of the present disclosure, which are, for clarity, described in the context of separate embodiments, may also be provided in combination in a single embodiment. Conversely, various features of the present disclosure, which are, for brevity, described in the context of a single embodiment, may also be provided separately or in any suitable combination or as suitable in any other described embodiment of the disclosure.

The invention claimed is:

1. A cabinet x-ray image system for obtaining colorized or grey scale density x-ray images of a specimen, the system comprising:
    a cabinet defining an interior chamber, wherein the cabinet comprises a walled enclosure surrounding the interior chamber, a door configured to cover the interior chamber and a sampling chamber for containing the specimen;
    a display;
    an x-ray unit including:
        an x-ray source;
        an x-ray detector; and
        a specimen platform configured to receive the specimen; and
    a controller configured to:
        selectively energize the x-ray source to emit x-rays towards the specimen and the x-ray detector;
        control the x-ray detector to collect x-rays, which passed through the specimen when the x-ray source is energized;
        determine a density of different areas of the specimen by calculating a time of flight of X-ray photon particles through different areas of the specimen from data collected from the x-ray detector;
        create a density x-ray image of the specimen, wherein the different areas of the specimen are indicated as a density or range of densities based on the determined density of different areas of the specimen, wherein the density x-ray image is colorized or grey scale; and
        selectively display the density x-ray image of the specimen on the display.

2. The cabinet x-ray image system of claim 1, wherein the specimen is selected from an excised tissue, an organ and a bone.

3. The cabinet x-ray image system of claim 1, wherein the specimen platform is configured for any organic or inorganic specimen that fits inside an x-ray cabinet.

4. The cabinet x-ray image system of claim 1, further comprising:
    an optical camera configured to capture an optical image of the specimen; and
    wherein the controller is configured to:
        control the optical camera to capture and collect the optical image of the specimen; and
        selectively display the density x-ray image and the optical image of the specimen on the display.

5. The cabinet x-ray image system of claim 4, wherein the density x-ray image and the optical image of the specimen are displayed in an overlaid manner.

6. The cabinet x-ray image system of claim 1, wherein:
    the x-ray source emits a first amount of x-rays;
    the x-ray detector includes a plurality of pixels in an array, wherein a pixel of the plurality of pixels in the array is configured to detect a second amount of x-rays; and
    wherein the controller creates the density x-ray image from the plurality of pixels by comparing the first amount of x-rays and the second amount of x-rays for each pixel of the plurality of pixels in the array.

7. The cabinet x-ray image system of claim 1, wherein the different areas of the specimen of the density x-ray image are displayed in different grey scale, different color or different shades of color.

8. A method for obtaining colorized or grey scale density x-ray images of a specimen using a cabinet x-ray image system, wherein the cabinet x-ray image system comprises:
    a cabinet defining an interior chamber, wherein the cabinet comprises a walled enclosure surrounding the interior chamber, a door configured to cover the interior chamber and a sampling chamber for containing the specimen;
    a display;
    an x-ray unit including:
        an x-ray source;
        an x-ray detector; and
        a specimen platform configured for to receive the specimen; and
    a controller, wherein the method comprises the controller:
        selectively energizing the x-ray source to emit x-rays towards the specimen and the x-ray detector;
        controlling the x-ray detector to collect x-rays, which passed through the specimen when the x-ray source is energized;
        determining a density of different areas of the specimen by calculating a time of flight of X-ray photon particles through different areas of the specimen from data collected from the x-ray detector;
        creating a density x-ray image of the specimen, wherein the different areas of the specimen are indicated as a density or range of densities based on the determined density of different areas of the specimen, wherein the density x-ray image is colorized or grey scale; and
        selectively displaying the density x-ray image of the specimen on the display.

9. The method of claim 8, wherein the cabinet x-ray image system further includes:
    an optical camera configured to capture an optical image of the specimen; and the method further includes the controller:
        controlling the optical camera system to capture and collect the optical image of the specimen; and
        selectively displaying the density x-ray image and the optical image of the specimen on the display.

10. The method of claim 8, wherein the method further includes displaying the density x-ray image and the optical image of the specimen in an overlaid manner.

11. The method of claim 8, wherein the method further includes the x-ray detector performing photon-counting.

12. The method of claim 11, wherein the photon-detector is selected from a photomultiplier, a Geiger counter, a single-photon avalanche diode, a superconducting nanowire single-photon detector, a transition edge sensor, a charge coupled device (CCD) x-ray detector, a scintillation counter, and a hybrid pixel photon counting detector.

13. The method of claim 8, further comprising displaying the different areas of the specimen in different grey scale, different color or different shades of color.

* * * * *